United States Patent
Yang et al.

(10) Patent No.: US 9,860,147 B2
(45) Date of Patent: Jan. 2, 2018

(54) METHOD AND DEVICE FOR GENERATING CNM

(71) Applicant: HUAWEI TECHNOLOGIES CO., LTD., Shenzhen, Guangdong (CN)

(72) Inventors: Hua Yang, Shenzhen (CN); Kaiming Huang, Shenzhen (CN); Chang Yi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 14/722,843

(22) Filed: May 27, 2015

(65) Prior Publication Data

US 2015/0350049 A1 Dec. 3, 2015

(30) Foreign Application Priority Data

May 27, 2014 (CN) .......................... 2014 1 0228094

(51) Int. Cl.
| | | |
|---|---|---|
| G06F 11/00 | (2006.01) |
| H04L 12/26 | (2006.01) |
| H04L 12/801 | (2013.01) |
| H04W 28/02 | (2009.01) |
| H04L 12/825 | (2013.01) |
| H04L 12/835 | (2013.01) |

(52) U.S. Cl.
CPC .......... *H04L 43/0882* (2013.01); *H04L 47/11* (2013.01); *H04L 47/115* (2013.01); *H04W 28/0289* (2013.01); *H04L 47/25* (2013.01); *H04L 47/263* (2013.01); *H04L 47/29* (2013.01); *H04L 47/30* (2013.01)

(58) Field of Classification Search
None
See application file for complete search history.

(56) References Cited

U.S. PATENT DOCUMENTS

| | | | |
|---|---|---|---|
| 4,599,691 A | | 7/1986 | Sakaki et al. |
| 6,046,983 A | * | 4/2000 | Hasegawa ........... H04L 12/5601 370/236.1 |
| 7,734,808 B1 | | 6/2010 | Bergamasco et al. |
| 9,319,334 B2 | * | 4/2016 | Matsuike ................ H04L 47/33 |

(Continued)

FOREIGN PATENT DOCUMENTS

| | | |
|---|---|---|
| CN | 101431465 A | 5/2009 |
| CN | 102025617 A | 4/2011 |
| WO | WO 2012068864 A1 | 5/2012 |

*Primary Examiner* — Alvin Zhu (74) *Attorney, Agent, or Firm* — Leydig, Voit & Mayer, Ltd.

(57) ABSTRACT

The present invention discloses a method and a device for generating a CNM, so as to improve a processing rate of a congestion problem. The method includes: monitoring a data volume of an output queue at a congestion point CP; monitoring a rate of a data stream corresponding to at least one congestion reaction point RP connected to the CP, and when the data volume of the output queue at the CP reaches a congestion threshold, obtaining identification information of a data stream that currently has a highest rate; generating a CNM for the data stream having the identification information, and sending the CNM to an RP corresponding to the identification information, so that the RP reduces, according to the CNM, the rate of the data stream corresponding to the RP.

10 Claims, 3 Drawing Sheets

(56) References Cited

U.S. PATENT DOCUMENTS

| | | |
|---|---|---|
| 2008/0198746 A1 | 8/2008 | Kwan et al. |
| 2010/0128605 A1 | 5/2010 | Chavan et al. |
| 2012/0163175 A1 | 6/2012 | Gupta |
| 2013/0124753 A1* | 5/2013 | Ansari ................ H04L 47/263 709/235 |
| 2013/0262604 A1 | 10/2013 | Elzur et al. |
| 2013/0297787 A1 | 11/2013 | Shah et al. |

* cited by examiner

METHOD AND DEVICE FOR GENERATING CNM

CROSS-REFERENCE TO RELATED APPLICATION

This application claims priority to Chinese Patent Application No. 201410228094.8, filed on May 27, 2014, which is hereby incorporated by reference in its entirety.

TECHNICAL FIELD

The present invention relates to the field of communications technologies, and in particular, to a method and a device for generating a CNM.

BACKGROUND

In a quantized congestion control technology (QCN, Quantized Congestion Notification protocol), a congestion reaction point (RP, Reaction Point) is disposed on a terminal device (station), where the RP is generally deployed in an output queue of the terminal device; a congestion detection point (CP, Congestion Point) is disposed in an egress port queue of a network device, and the CP determines, according to a cache consumption situation of the output queue, whether congestion occurs. If congestion is detected, a congestion notification message (CNM, Congestion Notification Message) including a congestion extent is constructed by using a sampling algorithm, and the CNM is sent to a source terminal that causes the congestion, so that the source terminal reduces a data transfer rate of a corresponding queue according to indication of the CNM. It can be learned that in the QCN in the prior art, a congestion source can be found relatively accurately, thereby resolving a technical problem of congestion.

However, the QCN in the prior art has a technical problem that reaction time is long and uncertain. To resolve this problem, priority-based flow control (PFC, Priority-based Flow Control) is introduced to the QCN in the prior art. PFC is an enhancement of a suspension mechanism in 802.3ad, where traffic is classified into traffic with 8 priorities according to a priority field of a virtual local area network identifier in the 802.1Q protocol, an independent suspension mechanism is separately implemented for traffic with each priority, and a PFC flow control frame is sent to a link peer end according to usage of a receiving cache of an input port, so as to instruct the peer end to suspend sending of network traffic with the priority. It can be learned that a reaction speed in the PFC is higher than that in the QCN.

Figure 1:
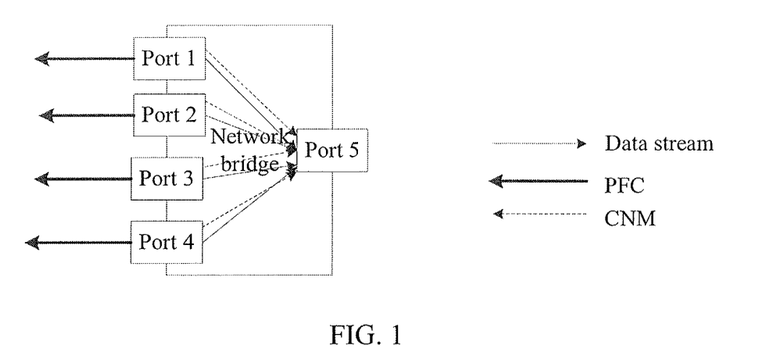
FIG. 1 is a schematic diagram of a QCN device in the prior art.

For specific implementation of a QCN technology to which the PFC technology is introduced, refer to FIG. 1. It can be learned from a schematic diagram of a QCN device shown in FIG. 1, port 1 to port 4 are input ports, port 5 is an output port, and a CP is deployed in an output queue of port 5. In this solution, a technical problem that reaction time is long in a QCN technology to which the PFC is not introduced is resolved in the following manner:

All output packets sent by all output ports are monitored on the QCN device, and if an output packet is a CNM message frame, the port is triggered to send a PFC flow control frame that has a corresponding priority to a peer end of the port.

In the QCN technology to which the PFC is introduced, the technical problem that reaction time is long in the QCN technology to which the PFC is not introduced can be resolved; however, in this solution, a sampling manner is still needed to locate an RP, and a sampling algorithm of the QCN is relatively blind. Therefore, in a specific implementation process, possibly, a congestion source can be located to control congestion only after sampling is performed for many times and multiple CNMs are sent, so that CNM sampling time is relatively long, and time for generating a CNM is relatively long, thereby leading to a relatively low processing rate of a congestion problem.

SUMMARY

Embodiments of the present invention provide a method and a device for generating a CNM, so as to improve a processing rate of a congestion problem.

A first aspect of the present invention provides a method for generating a congestion notification message CNM, including:

monitoring a data volume of an output queue at a congestion point CP;

monitoring a rate of a data stream corresponding to at least one congestion reaction point RP connected to the CP, and when the data volume of the output queue at the CP reaches a congestion threshold, obtaining identification information of a data stream that currently has a highest rate; and generating a CNM for the data stream having the identification information, and sending the CNM to an RP corresponding to the identification information, so that the RP reduces, according to the CNM, the rate of the data stream corresponding to the RP.

With reference to the first aspect, in a first possible implementation manner, the monitoring a rate of a data stream corresponding to at least one congestion reaction point RP connected to the CP, and when the data volume of the output queue at the CP reaches a congestion threshold, obtaining identification information of a data stream that currently has a highest rate specifically includes:

before the data volume of the output queue at the CP reaches the congestion threshold, cyclically performing the following steps:

when a packet enters the output queue, determining whether identification information of the packet is consistent with identification information of a data stream in first data information, where the first data information includes identification information and a first count value of a data stream that continuously enters the output queue after the first data information is reset, and the first count value is specifically a data volume of the data stream that continuously enters the output queue after the first data information is reset;

if they are consistent, increasing a value of the first count value by one or by a length of the packet, and using an obtained result as a new first count value;

if they are inconsistent, comparing the first count value with a second count value included in second data information, where the second data information further includes identification information of a data stream that historically has a highest rate, and the second count value is specifically a data volume of the data stream that historically has the highest rate and continuously enters the output queue at that moment;

if the first count value is greater than the second count value, using the first data information to overwrite the second data information, so as to use the first data information as reset second data info illation, and recording data information of the packet and using the data information of the packet as reset first data information; or if the first count value is less than the second count value, recording data information of the packet, using the data information of the packet as reset first data information, and keeping the second data information unchanged; and when the data volume of the output queue at the CP reaches the congestion threshold, acquiring identification information of a data stream that has a highest rate at a current moment, and using the acquired identification information as the identification information of the data stream that currently has the highest rate.

With reference to the first aspect or the first possible implementation manner of the first aspect, in a second possible implementation manner, after the generating a CNM for the data stream having the identification information, the method further includes:

controlling a source port of the data stream corresponding to the identification information to send a priority-based flow control PFC flow control frame that has a corresponding priority to a neighboring device of the source port, so that the neighboring device of the source port suspends sending of a data stream that has the corresponding priority.

With reference to the second possible implementation manner of the first aspect, in a third possible implementation manner, after the controlling a source port of the data stream corresponding to the identification information to send a priority-based flow control PFC flow control frame that has a corresponding priority to a neighboring device of the source port, the method further includes:

clearing the first data information and the second data information.

With reference to the first aspect or any possible implementation manner of the first possible implementation manner of the first aspect to the third possible implementation manner of the first aspect, in a fourth possible implementation manner, the generating a CNM for the data stream having the identification information is specifically:

generating the CNM according to a recorded data volume, where the CNM is used to instruct to reduce a sending rate of the data stream corresponding to the identification information, and the recorded data volume is in inverse proportion to the sending rate.

With reference to the first aspect or any possible implementation manner of the first possible implementation manner of the first aspect to the fourth possible implementation manner of the first aspect, in a fifth possible implementation manner, the monitoring a rate of a data stream corresponding to at least one congestion reaction point RP connected to the CP is specifically:

when the data volume of the output queue at the CP reaches a pre-congestion threshold, enabling a traffic monitoring function for the rate of the data stream corresponding to the at least one RP, where the pre-congestion threshold is less than the congestion threshold; and/or when the data volume of the output queue at the CP is less than the pre-congestion threshold, disabling the traffic monitoring function for the rate of the data stream corresponding to the at least one RP, and clearing the first data information and the second data information.

With reference to the first aspect or any possible implementation manner of the first possible implementation manner of the first aspect to the fourth possible implementation manner of the first aspect, in a sixth possible implementation manner, the monitoring a rate of a data stream corresponding to at least one congestion reaction point RP connected to the CP is specifically: enabling a traffic monitoring function for the rate of the data stream corresponding to the at least one RP on schedule.

With reference to any possible implementation manner of the first possible implementation manner of the first aspect to the sixth possible implementation manner of the first aspect, in a seventh possible implementation manner, the method further includes:

at a preset time interval, clearing the first data information; and/or at the preset time interval, clearing the second data information.

A second aspect of the present invention provides a device for generating a congestion notification message CNM, including:

a first monitoring module, configured to monitor a data volume of an output queue at a congestion point CP;

a second monitoring module, configured to: monitor a rate of a data stream corresponding to at least one congestion reaction point RP connected to the CP; and when the data volume of the output queue at the CP reaches a congestion threshold, obtain identification information of a data stream that currently has a highest rate; and a generating module, configured to generate a CNM for the data stream having the identification information, and send the CNM to an RP corresponding to the identification information, so that the RP reduces, according to the CNM, the rate of the data stream corresponding to the RP.

With reference to the second aspect, in a first possible implementation manner, the second monitoring module is specifically configured to:

before the data volume of the output queue at the CP reaches the congestion threshold, cyclically perform the following steps:

when a packet enters the output queue, determining whether identification information of the packet is consistent with identification information of a data stream in first data information, where the first data information includes identification information and a first count value of a data stream that continuously enters the output queue after the first data information is reset, and the first count value is specifically a data volume of the data stream that continuously enters the output queue after the first data information is reset;

if they are consistent, increasing a value of the first count value by one or by a length of the packet, and using an obtained result as a new first count value;

if they are inconsistent, comparing the first count value with a second count value included in second data information, where the second data information further includes identification information of a data stream that historically has a highest rate, and the second count value is specifically a data volume of the data stream that historically has the highest rate and continuously enters the output queue at that moment;

if the first count value is greater than the second count value, using the first data information to overwrite the second data information, so as to use the first data information as reset second data information, and recording data information of the packet and using the data information of the packet as reset first data information; or if the first count value is less than the second count value, recording data information of the packet, using the data information of the packet as reset first data information, and keeping the second data information unchanged; and when the data volume of the output queue at the CP reaches the congestion threshold, acquiring identification information of a data stream that has a highest rate at a current moment, and using the acquired identification information as the identification information of the data stream that currently has the highest rate.

With reference to the second aspect or the first possible implementation manner of the second aspect, in a second possible implementation manner, the device further includes a control module, configured to control a source port of the data stream corresponding to the identification information to send a priority-based flow control PFC flow control frame that has a corresponding priority to a neighboring device of the source port, so that the neighboring device of the source port suspends sending of a data stream that has the corresponding priority.

With reference to the second possible implementation manner of the second aspect, in a third possible implementation manner, the device further includes a clearing module, configured to clear the first data information and the second data information after the source port of the data stream corresponding to the identification information is controlled to send the priority-based flow control PFC flow control frame that has the corresponding priority to the neighboring device of the source port.

With reference to the second aspect or any possible implementation manner of the first possible implementation manner of the second aspect to the third possible implementation manner of the second aspect, in a fourth possible implementation manner, the generating module is specifically configured to generate the CNM according to a recorded data volume, where the CNM is used to instruct to reduce a sending rate of the data stream corresponding to the identification information, and the recorded data volume is in inverse proportion to the sending rate.

With reference to the second aspect or any possible implementation manner of the first possible implementation manner of the second aspect to the fourth possible implementation manner of the second aspect, in a fifth possible implementation manner, that the second monitoring module is configured to monitor the rate of the data stream corresponding to the at least one congestion reaction point RP connected to the CP is specifically:

when the data volume of the output queue at the CP reaches a pre-congestion threshold, enabling a traffic monitoring function for the rate of the data stream corresponding to the at least one RP, where the pre-congestion threshold is less than the congestion threshold; and/or when the data volume of the output queue at the CP is less than the pre-congestion threshold, disabling the traffic monitoring function for the rate of the data stream corresponding to the at least one RP, and clearing the first data information and the second data information.

With reference to the second aspect or any possible implementation manner of the first possible implementation manner of the second aspect to the fourth possible implementation manner of the second aspect, in a sixth possible implementation manner, that the second monitoring module is configured to monitor the rate of the data stream corresponding to the at least one congestion reaction point RP connected to the CP is specifically: enabling a traffic monitoring function for the rate of the data stream corresponding to the at least one RP on schedule.

With reference to any possible implementation manner of the first possible implementation manner of the second aspect to the sixth possible implementation manner of the second aspect, in a seventh possible implementation manner, the device further includes the clearing module, configured to: at a preset time interval, clear the first data information; and/or at the preset time interval, clear the second data information.

According to a third aspect, an embodiment of the present invention provides a device for generating a CNM, where the device may be specifically an Ethernet network bridge, and the device includes an ASIC (Application Specific Integrated Circuits, application specific integrated circuit) chip and physical interfaces connected to other network bridges or devices. Functions of each port that communicates with the outside are implemented by using these physical interfaces. Code corresponding to the foregoing first aspect and each possible implementation manner of the first aspect is written permanently into the chip by designing programming for the ASIC chip; therefore, when operating, the chip can execute the methods in the foregoing first aspect and each possible implementation manner of the first aspect.

Beneficial effects of the present invention are as follows:

In the embodiments of the present invention, when a data volume of an output queue at a CP reaches a congestion threshold, identification information of a data stream that currently has a highest rate may be obtained, and a CNM may be directly generated for the data stream corresponding to the identification information; therefore, after receiving the CNM, an RP corresponding to the identification information may reduce, according to the CNM, the rate of the data stream corresponding to the RP. That is, when the CNM is being generated, it is not required to perform sampling for many times; instead, the data stream that currently has the highest rate is directly located and regarded as a congestion source, thereby reducing CNM sampling time and improving a processing rate of a congestion problem. In addition, it is not required to monitor each output packet at each output port, so that system overheads are reduced.

DESCRIPTION OF EMBODIMENTS

To resolve a technical problem in the prior art that relatively long CNM sampling time leads to a relatively low processing rate of a congestion problem, an embodiment of the present invention provides a method for generating a CNM, where the method includes: monitoring a data volume of an output queue at a congestion point CP; monitoring a rate of a data stream corresponding to at least one congestion reaction point RP connected to the CP, and when the data volume of the output queue at the CP reaches a congestion threshold, obtaining identification information of a data stream that currently has a highest rate; and generating a CNM for the data stream having the identification information, and sending the CNM to an RP corresponding to the identification information, so that the RP reduces, according to the CNM, the rate of the data stream corresponding to the RP.

When a data volume of an output queue at a CP reaches a congestion threshold, identification information of a data stream that currently has a highest rate may be obtained, and a CNM may be directly generated for the data stream corresponding to the identification information; therefore, after receiving the CNM, an RP corresponding to the identification information may reduce, according to the CNM, the rate of the data stream corresponding to the RP. That is, when the CNM is being generated, it is not required to perform sampling for many times; instead, the data stream that currently has the highest rate is directly located and regarded as a congestion source, thereby reducing CNM sampling time and improving a processing rate of a congestion problem.

In addition, it is not required to monitor each output packet at each output port, so that system overheads are reduced.

The following expounds main implementation principles of the technical solutions in the embodiments of the present invention, specific implementation manners thereof, and corresponding achievable beneficial effects with reference to each accompanying drawing.

Embodiment 1

Figure 2:
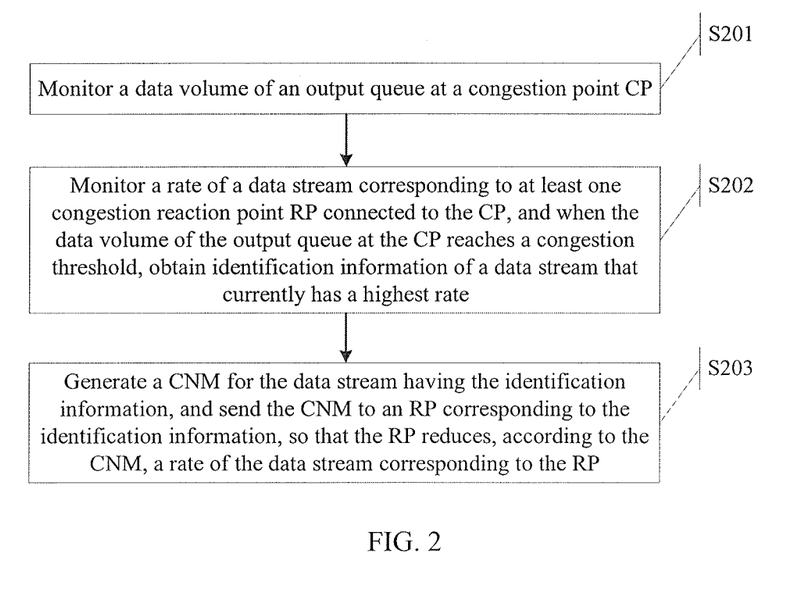
FIG. 2 is a main flowchart of a method for generating a CNM according to an embodiment of the present invention.

Referring to FIG. 2, a method for generating a CNM according to Embodiment 1 of the present invention is specifically as follows:

Step S201: Monitor a data volume of an output queue at a congestion point CP.

Step S202: Monitor a rate of a data stream corresponding to at least one congestion reaction point RP connected to the CP, and when the data volume of the output queue at the CP reaches a congestion threshold, obtain identification information of a data stream that currently has a highest rate.

Step S203: Generate a CNM for the data stream having the identification information, and send the CNM to an RP corresponding to the identification information, so that the RP reduces, according to the CNM, a rate of the data stream corresponding to the RP.

Optionally, in this embodiment of the present invention, the monitoring a rate of a data stream corresponding to at least one congestion reaction point RP connected to the CP, and when the data volume of the output queue at the CP reaches a congestion threshold, obtaining identification information of a data stream that currently has a highest rate specifically includes:

before the data volume of the output queue at the CP reaches the congestion threshold, cyclically performing the following steps:

when a packet enters the output queue, determining whether identification information of the packet is consistent with identification information of a data stream in first data information, where the first data information includes identification information and a first count value of a data stream that continuously enters the output queue after the first data information is reset, and the first count value is specifically a data volume of the data stream that continuously enters the output queue after the first data information is reset;

if they are consistent, increasing a value of the first count value by one or by a length of the packet, and using an obtained result as a new first count value;

if they are inconsistent, comparing the first count value with a second count value included in second data information, where the second data information further includes identification information of a data stream that historically has a highest rate, and the second count value is specifically a data volume of the data stream that historically has the highest rate and continuously enters the output queue at that moment;

if the first count value is greater than the second count value, using the first data information to overwrite the second data information, so as to use the first data information as reset second data information, and recording data information of the packet and using the data information of the packet as reset first data information; or if the first count value is less than the second count value, recording data information of the packet, using the data information of the packet as reset first data information, and keeping the second data information unchanged; and when the data volume of the output queue at the CP reaches the congestion threshold, acquiring identification information of a data stream that has a highest rate at a current moment, and using the acquired identification information as the identification information of the data stream that currently has the highest rate.

In this embodiment of the present invention, resetting one piece of data information means simultaneously resetting identification information and a count value of a data stream in the piece of data information. For example, resetting the first data information means simultaneously resetting the identification information of the data stream recorded in the first data information and the first count value. Increasing only the first count value by one or by the length of the packet can only be referred to as updating the first data information, but cannot be referred to as resetting the first data information.

For example, for the first data information, initializing the first data information may be referred to as resetting the first data information; if the first count value is greater than the second count value, recording the data information of the packet may be referred to as resetting the first data information; if the first count value is less than the second count value, recording the data information of the packet may be referred to as resetting the first data information, and so on.

For example, for the second data information, initializing the second data information may be referred to as resetting the second data information; if the first count value is greater than the second count value, using the first data information to overwrite the second data information may be referred to as resetting the second data information, and so on.

It is introduced in this embodiment of the present invention that the second data information includes the identification information of the data stream that historically has the highest rate, where the "highest rate" herein does not mean that the data stream has the highest rate in practice, and only means that the data stream has the highest rate within a statistical period set in this embodiment of the present invention.

In this embodiment of the present invention, it may be considered that: within a period of statistical time, a higher rate of a data stream that enters the output queue indicates a larger data volume of the data stream. Therefore, determining of the data stream that historically has the highest rate in this embodiment of the present invention is equivalent to determining of a data stream that historically has a largest data volume.

In a specific implementation process, each data stream includes identification information, and identification information of a data stream is information used to identify the data stream, which, for example, may be a CN tag (Congestion Notification Tag, congestion notification tag) or a data stream ID, where the data stream ID may be represented by a source MAC+a priority. After a packet enters the CP, matching is performed between identification information of the packet and the identification information of the data stream in the first data information. If the matching is successful, it indicates that a data stream to which the packet belongs is the same as a recorded data stream; therefore, the recorded first count value is increased by one or by a length of the packet, and then a new first count value is obtained. If the matching fails, it indicates that the data stream to which the packet belongs is different from the recorded data stream; therefore, two count values may further be compared, so as to determine whether the second data information needs to be reset.

In a specific implementation process, the second data information includes information for generating the CNM, which, for example, is the identification information, a destination MAC, and a VLAN of the data stream, and then the CNM may be constructed by using these pieces of information. When the CNM is being constructed, the identification information is returned to a terminal on which an RP21 is located, where the terminal is connected to multiple RPs; and then, an RP to which the data stream that has the highest rate at the current moment belongs is determined by using the identification information. When the identification information is a CN tag, the data stream that has the highest rate at the current moment may be determined by using the CN tag. In the IEEE 802.1Qau standard, it is specified that when a packet does not carry a CN tag, the identification information may be a packet source MAC+a priority, and then the data stream that has the highest rate at the current moment is determined by using the packet source MAC+ the priority. The source MAC and the VLAN may be used as a Layer 2 header of a CNM packet.

The constructed CNM may be used to instruct to reduce a sending rate of the data stream corresponding to the identification information, for example, to reduce the sending rate by 10%, 20%, or 100%, where it is a special case reduce the sending rate by 100%, which indicates that data stream sending is stopped.

Optionally, in this embodiment of the present invention, after the generating a CNM for the data stream having the identification information, the method further includes:

controlling a source port of the data stream corresponding to the identification information to send a priority-based flow control PFC flow control frame that has a corresponding priority to a neighboring device of the source port, so that the neighboring device of the source port suspends sending of a data stream that has the corresponding priority.

Compared with the CNM, the PFC flow control frame has a higher rate; therefore, a congestion reaction speed can be improved. In addition, in the prior art, each input port queue has one PFC back pressure threshold; therefore, it needs to ensure that a cache of the output queue at the CP is greater than the sum of all PFC back pressure thresholds of input port queues, so as to ensure that the PFC flow control frame does not fail. However, in the present application, a PFC flow control frame is generated when the output queue of the output queue at the CP reaches a pre-congestion threshold, thereby preventing a failure of the PFC flow control frame, and reducing a cache resource requirement of the output queue at the CP.

Optionally, in this embodiment of the present invention, after the controlling a source port of the data stream corresponding to the identification information to send a priority-based flow control PFC flow control frame that has a corresponding priority to a neighboring device of the source port, the method further includes:

clearing the first data information and the second data information.

After the PFC flow control frame is sent, it indicates that current congestion has been processed; therefore, in this case, processing the first data information and the second data information can ensure that recorded data information is data information of a data stream that currently or recently has the highest rate. If the first data information and the second data information are not cleared, the recorded data information may be data information of a data stream at a previous time (for example, one second ago, or one minute ago). As a result, a recorded data stream is different from a data stream that currently undergoes congestion; and in this case, a generated CNM cannot achieve an effect of relieving congestion.

Optionally, in a further preferable embodiment, the generating a CNM for the data stream having the identification information is specifically:

generating the CNM according to a recorded data volume, where the CNM is used to instruct to reduce a sending rate of the data stream corresponding to the identification information, and the recorded data volume is in inverse proportion to the sending rate.

In a specific implementation process, when the CNM is being generated, reference may further be made to the recorded data volume, where a higher recorded data volume indicates a higher congestion extent, and then a reduction extent of the sending rate is higher, so that the data volume is in inverse proportion to the sending rate. In this case, the sending rate of the data stream can be controlled more accurately, which, on one hand, can resolve a congestion problem as far as possible, and on the other hand, can further prevent the sending rate from being reduced to an extremely low value, thereby preventing congestion at each port of the data stream and further preventing a reduction in network transmission efficiency.

In a specific implementation process, a Quantized Feedback field may be set to instruct the RP to perform corresponding processing. For example, a setting of Quantized Feedback=0b111111 indicates that sending a packet to the CP is stopped, that is, sending traffic is reduced to 0%; a setting of Quantized Feedback=0b111110 indicates that the sending traffic is reduced to 10%; a setting of Quantized Feedback=0b111101 indicates that the sending traffic is reduced to 20%, and so on.

Optionally, in this embodiment of the present invention, one possible manner of the monitoring a rate of a data stream corresponding to at least one congestion reaction point RP connected to the CP is:

when the data volume of the output queue at the CP reaches a pre-congestion threshold, enabling a traffic monitoring function for the rate of the data stream corresponding to the at least one RP, where the pre-congestion threshold is less than the congestion threshold; and/or when the data volume of the output queue at the CP is less than the pre-congestion threshold, disabling the traffic monitoring function for the rate of the data stream corresponding to the at least one RP, and clearing the first data information and the second data information.

Figure 3:
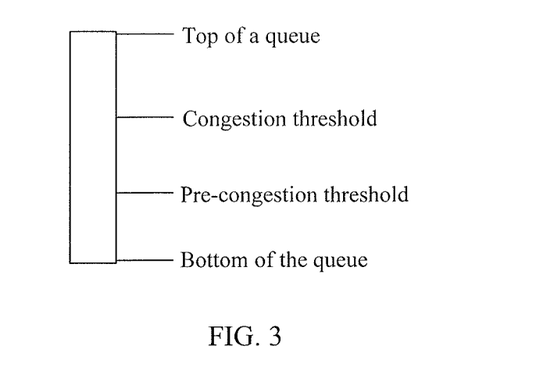
FIG. 3 is a schematic diagram of an output queue at a CP according to an embodiment of the present invention.

As shown in FIG. 3, FIG. 3 is a schematic diagram of an output queue at a CP. In this embodiment of the present invention, the congestion threshold is greater than the pre-congestion threshold; therefore, only after the data volume of the output queue at the CP reaches the pre-congestion threshold, the congestion threshold may be reached. Therefore, if the traffic monitoring function is enabled only when the data volume of the output queue at the CP reaches the pre-congestion threshold, a monitoring burden may be reduced.

After the traffic monitoring function is enabled, it is possible that the data volume of the output queue at the CP is reduced to be lower than the pre-congestion threshold again. In this case, it indicates that the data volume of the output queue at the CP does not reach the congestion threshold temporarily; therefore, it is not required to perform traffic monitoring, and the traffic monitoring function is controlled to be in a disabled state. In addition, in order to prevent currently recorded data information from affecting next traffic monitoring, the first data information and the second data information are cleared.

Optionally, in this embodiment of the present invention, another possible manner of the monitoring a rate of a data stream corresponding to at least one congestion reaction point RP connected to the CP is:

enabling a traffic monitoring function for the rate of the data stream corresponding to the at least one RP on schedule.

That is, in this embodiment of the present invention, when the data volume of the output queue at the CP reaches the pre-congestion threshold, the traffic monitoring function may be enabled for the rate of the data stream corresponding to the at least one RP; or the traffic monitoring function may also be enabled on schedule for the rate of the data stream corresponding to the at least one RP. The two enabling manners may be selected at random or be used in combination, which can better satisfy a monitoring requirement.

Optionally, in this embodiment of the present invention, the method further includes:

at a preset time interval, clearing the first data information; and/or at the preset time interval, clearing the second data information.

The preset time interval may be at a second level, a minute level, or the like.

A purpose of clearing is to achieve a better effect. If the first data information and the second data information are not cleared, recorded data information may be data information of a previous data stream. In this case, it is possible that the recorded information of the data stream cannot reflect information about a highest rate of a data stream that currently undergoes congestion, and a generated CNM cannot achieve an effect of relieving congestion.

Optionally, in this embodiment of the present invention, the sending the CNM to an RP corresponding to the identification information, so that the RP reduces the rate of the data stream corresponding to the RP may be specifically enabling the RP to stop sending the data stream corresponding to the RP.

The following describes a method for generating a CNM in the present invention by using several specific embodiments. It should be noted that the embodiments of the present invention are only used to explain the present invention, and cannot be used to limit the present invention. All embodiments that comply with the idea of the present invention are within the protection scope of the present invention, and a person skilled in the art naturally knows how to perform variations according to the idea of the present invention.

Embodiment 2

Based on the foregoing embodiment, this embodiment of the present invention describes a specific implementation method. In this embodiment of the present invention, the foregoing method may be completed by a processing chip. An interior of the chip includes two rate registers corresponding to one CP, for example, a first rate register and a second rate register shown in FIG. 4, where the first rate register is configured to record identification information of a data stream that continuously enters an output queue after first data information is reset, the first data information includes the identification information and a first count value of the data stream that continuously enters the output queue after the first data information is reset, and CNM information required for constructing CNM, and the CNM information required for constructing CNM may specifically include a packet priority, a destination MAC, a source MAC, a VLAN, and the like; and the second rate register is configured to record second data information, and the second data information is specifically identification information and a second count value of a data stream that historically has a highest rate, the CNM information required for constructing CNM, and the like.

Figure 4:
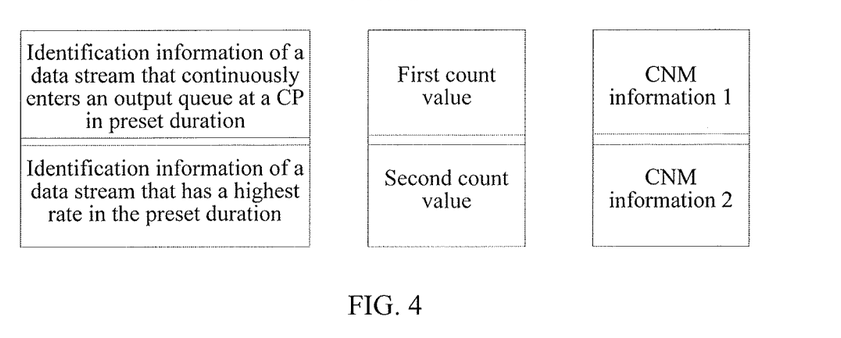
FIG. 4 is a schematic diagram of content stored in a first rate register and a second rate register according to an embodiment of the present invention.

A method for generating a CNM specifically includes the following steps:

when the device is powered on and initialized, clearing the first rate register and the second rate register, and in an operating process of the device, performing the following operations on each packet that enters the output queue at the CP:

if identification information of the packet is the same as the identification information recorded in the first rate register, increasing the first count value by one to obtain a new first count value; ending processing of the packet, and continuing to process a next packet;

if the identification information of the packet is different from the identification information recorded in the first rate register, comparing the first count value with the second count value;

if the first count value is greater than the second count value, using the first data information to overwrite the second data information, writing the identification information of the current packet and information for constructing CNM into the first rate register, and setting the first count value to 1;

if the first count value is less than the second count value, directly writing the identification information of the current packet and the information for constructing CNM into the first rate register, setting the first count value to 1, and keeping the second data information recorded in the second rate register unchanged;

clearing, on schedule, the first data information recorded in the first rate register and clearing the second data information recorded in the second rate register;

when determining that a data volume of the output queue reaches a congestion threshold, generating a CNM according to the information for constructing CNM that is included in the second data information, and setting a congestion extent parameter in the CNM to instruct an RP to reduce a rate of a corresponding data stream, for example, to directly instruct the RP to stop sending the corresponding data stream;

when sending the CNM, triggering a source port recorded in the information for constructing CNM to send a PFC flow control frame that has a corresponding priority to a neighboring device of the source port, and using a method in which QCN and PFC are combined, to improve a congestion reaction speed and reduce a cache resource requirement of the output queue at the CP; and after sending the PFC flow control frame and the CNM, clearing the first data information and the second data information, and repeatedly performing the foregoing steps.

Embodiment 3

Based on the foregoing embodiments, this embodiment of the present invention provides a triggering condition method for enabling a traffic monitoring function.

Figure 5:
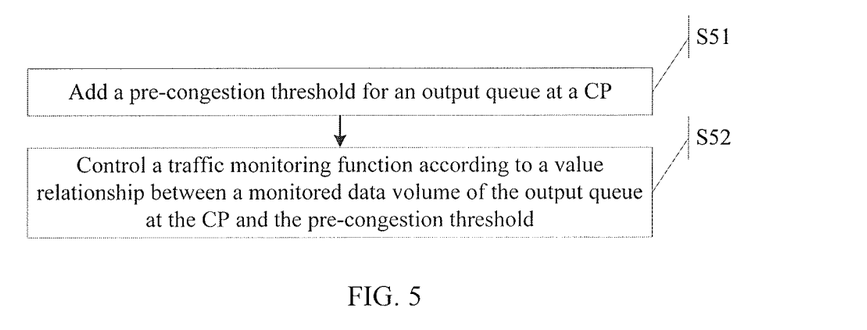
FIG. 5 is a flowchart for generating a CNM according to an embodiment of the present invention.

As shown in FIG. 5, a method for generating a CNM specifically includes the following steps:

Step S51: Add a pre-congestion threshold for an output queue at a CP, and as shown in FIG. 5, set a value of the pre-congestion threshold to be slightly greater (for example, 10%) than the number of caches consumed by the queue in a normal forwarding state (in which input bandwidth is less than or equal to output bandwidth).

Step S52: Control the traffic monitoring function according to a result of comparing a monitored data volume of the output queue at the CP with the pre-congestion threshold:

(A) When the data volume of the output queue is less than the pre-congestion threshold, disable the traffic monitoring function;

(B) when the data volume of the output queue increases and exceeds the pre-congestion threshold, enable the traffic monitoring function, and start to monitor traffic of a data stream; and (C) when the data volume of the output queue exceeds the pre-congestion threshold, disable the traffic monitoring function, and clear first data information stored in the first rate register and second data information stored in the second rate register.

Embodiment 4

Figure 6:
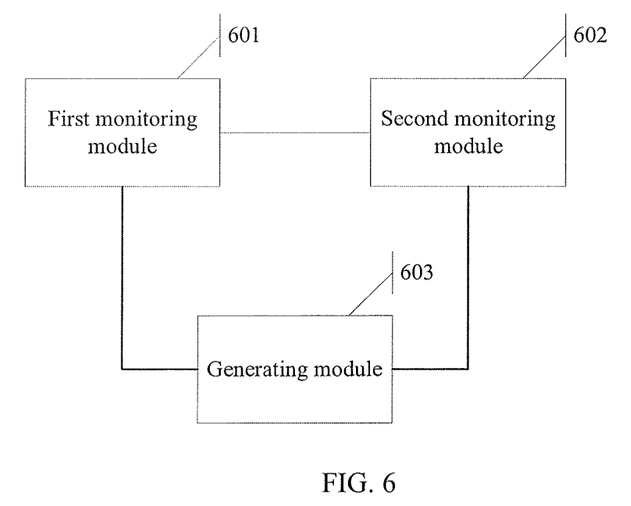
FIG. 6 is a main structural block diagram of a device for generating a CNM according to an embodiment of the present invention.

Referring to FIG. 6, based on a same invention conception and the foregoing embodiments, this embodiment of the present invention provides a device for generating a CNM, where the device includes a first monitoring module 601, a second monitoring module 602, and a generating module 603.

The first monitoring module 601 is configured to monitor a data volume of an output queue at a congestion point CP.

The second monitoring module 602 is configured to: monitor a rate of a data stream corresponding to at least one congestion reaction point RP connected to the CP; and when the data volume of the output queue at the CP reaches a congestion threshold, obtain identification information of a data stream that currently has a highest rate.

The generating module 603 is configured to generate a CNM for the data stream having the identification information, and send the CNM to an RP corresponding to the identification information, so that the RP reduces, according to the CNM, the rate of the data stream corresponding to the RP.

Optionally, in this embodiment of the present invention, the second monitoring module 602 is specifically configured to:

before the data volume of the output queue at the CP reaches the congestion threshold, cyclically perform the following steps:

when a packet enters the output queue, determining whether identification information of the packet is consistent with identification information of a data stream in first data information, where the first data information includes identification information and a first count value of a data stream that continuously enters the output queue after the first data information is reset, and the first count value is specifically a data volume of the data stream that continuously enters the output queue after the first data information is reset;

if they are consistent, increasing a value of the first count value by one or by a length of the packet, and using an obtained result as a new first count value;

if they are inconsistent, comparing the first count value with a second count value included in second data information, where the second data information further includes identification information of a data stream that historically has a highest rate, and the second count value is specifically a data volume of the data stream that historically has the highest rate and continuously enters the output queue at that moment;

if the first count value is greater than the second count value, using the first data information to overwrite the second data information, so as to use the first data information as reset second data information, and recording data information of the packet and using the data information of the packet as reset first data information; or if the first count value is less than the second count value, recording data information of the packet, using the data information of the packet as reset first data information, and keeping the second data information unchanged; and when the data volume of the output queue at the CP reaches the congestion threshold, acquiring identification information of a data stream that has a highest rate at a current moment, and using the acquired identification information as the identification information of the data stream that currently has the highest rate.

Optionally, in this embodiment of the present invention, the device further includes a control module, configured to control a source port of the data stream corresponding to the identification information to send a priority-based flow control PFC flow control frame that has a corresponding priority to a neighboring device of the source port, so that the neighboring device of the source port suspends sending of a data stream that has the corresponding priority.

Optionally, in this embodiment of the present invention, the device further includes a clearing module, configured to clear the first data information and the second data information after the source port of the data stream corresponding to the identification information is controlled to send the priority-based flow control PFC flow control frame that has the corresponding priority to the neighboring device of the source port.

Optionally, in this embodiment of the present invention, the generating module 603 is specifically configured to generate the CNM according to a recorded data volume, where the CNM is used to instruct to reduce a sending rate of the data stream corresponding to the identification information, and the recorded data volume is in inverse proportion to the sending rate.

Optionally, in this embodiment of the present invention, that the second monitoring module 602 is configured to monitor the rate of the data stream corresponding to the at least one congestion reaction point RP connected to the CP is specifically:

when the data volume of the output queue at the CP reaches a pre-congestion threshold, enabling a traffic monitoring function for the rate of the data stream corresponding to the at least one RP, where the pre-congestion threshold is less than the congestion threshold; and/or when the data volume of the output queue at the CP is less than the pre-congestion threshold, disabling the traffic monitoring function for the rate of the data stream corresponding to the at least one RP, and clearing the first data information and the second data information.

Optionally, in this embodiment of the present invention, that the second monitoring module 602 is configured to monitor the rate of the data stream corresponding to the at least one congestion reaction point RP connected to the CP is specifically: enabling a traffic monitoring function for the rate of the data stream corresponding to the at least one RP on schedule.

Optionally, in this embodiment of the present invention, the clearing module is further configured to: at a preset time interval, clear the first data information; and/or at the preset time interval, clear the second data information.

In this embodiment, for specific implementation details of each module of the device when each module executes a task, refer to method embodiments described above. Details are not described herein again.

Embodiment 5

Figure 7:
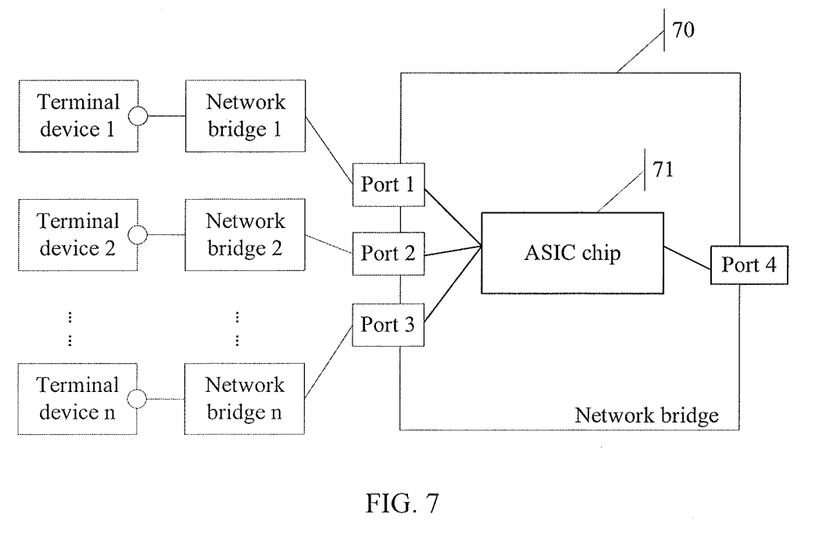
FIG. 7 is a schematic diagram of an Ethernet network bridge according to an embodiment of the present invention.

Referring to FIG. 7, based on a same invention conception and the foregoing embodiments, this embodiment of the present invention provides a device for generating a CNM, where the device may be specifically an Ethernet network bridge 70 shown in FIG. 7, and the network bridge 70 includes an ASIC (Application Specific Integrated Circuits, application specific integrated circuit) chip 71 and physical interfaces (not shown herein) connected to other network bridges or devices. Functions of each port shown in the figure may be implemented by using these physical interfaces.

Code corresponding to the methods described above is written permanently into the chip by designing programming for the ASIC chip; therefore, when operating, the chip can execute the methods described in the foregoing embodiments. How to design programming for the ASIC chip is a technology well known to a person skilled in the art, and is not described herein again.

It should be noted that processing based on the ASIC chip is a relatively efficient manner, and in practice, technical solutions in this embodiment of the present invention may also be implemented by using an FPGA (Field-Programmable Gate Array, field-programmable gate array) chip or software (that is, based on a general CPU processor). How to implement the technical solutions in this embodiment of the present invention based on these components is also a technology well known to a person skilled in the art, and is not described herein again.

One or more embodiments of the present invention have at least the following beneficial effects:

In the embodiments of the present invention, when a data volume of an output queue at a CP reaches a congestion threshold, identification information of a data stream that currently has a highest rate may be obtained, and a CNM may be directly generated for the data stream corresponding to the identification information; therefore, after receiving the CNM, an RP corresponding to the identification information may reduce, according to the CNM, the rate of the data stream corresponding to the RP. That is, when the CNM is being generated, it is not required to perform sampling for many times; instead, the data stream that currently has the highest rate is directly located and regarded as a congestion source, thereby reducing CNM sampling time and improving a processing rate of a congestion problem. In addition, it is not required to monitor each output packet at each output port, so that system overheads are reduced.

Although some preferred embodiments of the present invention have been described, persons skilled in the art may make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for generating a congestion notification message (CNM), comprising:
    monitoring, by a device, a data volume of an output queue at a congestion point (CP);
    monitoring, by the device, a rate of a data stream corresponding to at least one congestion reaction point (RP) connected to the CP, and when the data volume of the output queue at the CP reaches a congestion threshold, obtaining identification information of a data stream that currently has a highest rate; and
    generating, by the device, a CNM for the data stream having the identification information, and sending the CNM to an RP corresponding to the identification information to facilitate reduction of a rate of the data stream having the identification information by the RP;
    wherein after generating the CNM, the method further comprises: controlling a source port of the data stream corresponding to the identification information to send a priority-based flow control (PFC) flow control frame that has a corresponding priority to a neighboring device of the source port to facilitate suspension of sending the data stream that has the corresponding priority;
    wherein after the controlling the source port, the method further comprises: clearing first data information and second data information;
    wherein the first data information comprises identification information and a first count value of a data stream that continuously enters the output queue after the first data information is reset, and the first count value is a data volume of the data stream that continuously enters the output queue after the first data information is reset; and
    wherein the second data information comprises identification information and a second count value of a data stream that historically has a highest rate, and the second count value is a data volume of the data stream that historically has the highest rate and continuously enters the output queue at that moment;
    wherein monitoring the rate of the data stream corresponding to the at least one congestion reaction point (RP) further comprises:
        when the data volume of the output queue at the CP reaches a pre-congestion threshold, enabling a traffic monitoring function for the rate of the data stream corresponding to the at least one RP, wherein the pre-congestion threshold is less than the congestion threshold; and/or
        when the data volume of the output queue at the CP is less than the pre-congestion threshold, disabling the traffic monitoring function for the rate of the data stream corresponding to the at least one RP, and clearing the first data information and the second data information.

2. The method according to claim 1, wherein monitoring the rate of the data stream corresponding to at least one congestion reaction point (RP) connected to the CP further comprises:
before the data volume of the output queue at the CP reaches the congestion threshold, cyclically performing the following steps:
when a packet enters the output queue, determining whether identification information of the packet is consistent with identification information of a data stream in the first data information; and
if they are consistent, increasing a value of the first count value by one or by a length of the packet, and using an obtained result as a new first count value; or
if they are inconsistent, comparing the first count value with a second count value comprised in the second data information; and
if the first count value is greater than the second count value, using the first data information to overwrite the second data information, so as to use the first data information as reset second data information, and recording data information of the packet and using the data information of the packet as reset first data information; or
if the first count value is less than the second count value, recording data information of the packet, using the data information of the packet as reset first data information, and keeping the second data information unchanged.

3. The method according to claim 1, wherein the CNM is generated according to a recorded data volume, wherein the CNM is configured to provide an instruction to reduce a sending rate of the data stream corresponding to the identification information, and wherein the recorded data volume is in inverse proportion to the sending rate.

4. The method according to claim 1, wherein monitoring the rate of the data stream corresponding to the at least one congestion reaction point (RP) further comprises:
enabling a traffic monitoring function for the rate of the data stream corresponding to the at least one RP based on a schedule.

5. The method according to claim 2, further comprising:
at a preset time interval, clearing the first data information; and/or
at the preset time interval, clearing the second data information.

6. A device for generating a congestion notification message (CNM), comprising a processor and a non-transitory processor-readable medium having a plurality of processor-executable instructions stored thereon, the processor-executable instructions including:
a first monitoring module, configured to monitor a data volume of an output queue at a congestion point (CP);
a second monitoring module, configured to: monitor a rate of a data stream corresponding to at least one congestion reaction point (RP) connected to the CP; and when the data volume of the output queue at the CP reaches a congestion threshold, obtain identification information of a data stream that currently has a highest rate; and
a generating module, configured to generate a CNM for the data stream having the identification information, and send the CNM to an RP corresponding to the identification information to facilitate reduction of a rate of the data stream having the identification information by the RP;
wherein the processor-executable instructions further comprise: a control module, configured to control a source port of the data stream corresponding to the identification information to send a priority-based flow control (PFC) flow control frame that has a corresponding priority to a neighboring device of the source port to facilitate suspension of sending the data stream that has the corresponding priority;
wherein the processor-executable instructions further comprise: a clearing module, configured to clear first data information and second data information after the source port of the data stream corresponding to the identification information is controlled to send the priority-based flow control (PFC) flow control frame that has the corresponding priority to the neighboring device of the source port;
wherein the first data information comprises identification information and a first count value of a data stream that continuously enters the output queue after the first data information is reset, and the first count value is a data volume of the data stream that continuously enters the output queue after the first data information is reset; and
wherein the second data information comprises identification information and a second count value of a data stream that historically has a highest rate, and the second count value is a data volume of the data stream that historically has the highest rate and continuously enters the output queue at that moment;
wherein the second monitoring module being configured to monitor the rate of the data stream corresponding to the at least one congestion reaction point (RP) comprises the second monitoring module being configured to:
when the data volume of the output queue at the CP reaches a pre-congestion threshold, enable a traffic monitoring function for the rate of the data stream corresponding to the at least one RP, wherein the pre-congestion threshold is less than the congestion threshold; and/or
when the data volume of the output queue at the CP is less than the pre-congestion threshold, disable the traffic monitoring function for the rate of the data stream corresponding to the at least one RP, and clear the first data information and the second data information.

7. The device according to claim 6, wherein the second monitoring module is further configured to:
before the data volume of the output queue at the CP reaches the congestion threshold, cyclically perform the following steps:
when a packet enters the output queue, determining whether identification information of the packet is consistent with identification information of a data stream in the first data information; and
if they are consistent, increasing a value of the first count value by one or by a length of the packet, and using an obtained result as a new first count value; or
if they are inconsistent, comparing the first count value with a second count value comprised in the second data information; and
if the first count value is greater than the second count value, using the first data information to overwrite the second data information, so as to use the first data information as reset second data information, and recording data information of the packet and using the data information of the packet as reset first data information; or if the first count value is less than the second count value, recording data information of the packet, using the data information of the packet as reset first data information, and keeping the second data information unchanged.

8. The device according to claim 6, wherein the CNM is generated according to a recorded data volume, wherein the CNM is configured to provide an instruction to reduce a sending rate of the data stream corresponding to the identification information, and wherein the recorded data volume is in inverse proportion to the sending rate.

9. The device according to claim 6, wherein the second monitoring module being configured to monitor the rate of the data stream corresponding to the at least one congestion reaction point (RP) comprises the second monitoring module being configured to:

enable a traffic monitoring function for the rate of the data stream corresponding to the at least one RP on schedule.

10. The device according to claim 7, wherein the clearing module is further configured to:

at a preset time interval, clear the first data information; and/or at the preset time interval, clear the second data information.

* * * * *